United States Patent
Arita et al.

(10) Patent No.: US 9,434,305 B2
(45) Date of Patent: Sep. 6, 2016

(54) VEHICLE APPROACH NOTIFICATION SOUND GENERATING APPARATUS

(75) Inventors: Hidekazu Arita, Tokyo (JP); Mitsuo Shimotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/414,646

(22) PCT Filed: Sep. 5, 2012

(86) PCT No.: PCT/JP2012/072597
§ 371 (c)(1),
(2), (4) Date: Jan. 13, 2015

(87) PCT Pub. No.: WO2014/038009
PCT Pub. Date: Mar. 13, 2014

(65) Prior Publication Data
US 2015/0191117 A1 Jul. 9, 2015

(51) Int. Cl.
*B60Q 1/00* (2006.01)
*B60Q 5/00* (2006.01)
*G10K 11/26* (2006.01)

(52) U.S. Cl.
CPC .............. *B60Q 5/006* (2013.01); *B60Q 5/008* (2013.01); *G10K 11/26* (2013.01)

(58) Field of Classification Search
CPC ..................................... B60Q 1/525
USPC .................. 340/435, 904; 701/36
See application file for complete search history.

(56) References Cited

U.S. PATENT DOCUMENTS

| 8,217,767 B2 | 7/2012 | Nakayama |
| 2005/0073438 A1* | 4/2005 | Rodgers ................. G08G 1/161 340/944 |
| 2011/0199199 A1* | 8/2011 | Perkins ................. B60Q 1/506 340/435 |

(Continued)

FOREIGN PATENT DOCUMENTS

| JP | 5-213112 A | 8/1993 |
| JP | 07322403 A | * 12/1995 |

(Continued)

OTHER PUBLICATIONS

English machine translation of JP407322403A, 7 pages, Oct. 15, 2015.*

*Primary Examiner* — Benjamin C Lee
*Assistant Examiner* — Israel Daramola
(74) *Attorney, Agent, or Firm* — Birch, Stewart, Kolasch & Birch, LLP

(57) ABSTRACT

It is an object of the present invention to provide a vehicle approach notification sound generating apparatus that is capable of generating a vehicle approach notification sound in a suitable range according to a vehicle speed. The vehicle approach notification sound generating apparatus of the present invention is characterized by including a vehicle speed calculating unit that calculates a vehicle speed, a vehicle external speaker that outputs a vehicle approach notification sound for notifying of approach of the vehicle, and a general controller that controls a directivity angle width representing a breadth of directivity of the vehicle approach notification sound or a directivity direction of the vehicle approach notification sound, wherein the general controller controls the directivity angle width or the directivity direction according to the speed calculated by the vehicle speed calculating unit.

7 Claims, 14 Drawing Sheets

(56) References Cited

U.S. PATENT DOCUMENTS

| | | | | |
|---|---|---|---|---|
| 2012/0025964 A1* | 2/2012 | Beggs | B60Q 1/2673 340/435 |
| 2012/0092185 A1* | 4/2012 | Hayashi | B60Q 5/008 340/904 |
| 2012/0323439 A1* | 12/2012 | Inakazu | B60Q 5/008 701/36 |

FOREIGN PATENT DOCUMENTS

| | | | |
|---|---|---|---|
| JP | 2005-333573 A | 12/2005 | |
| JP | 2011-255790 A | 12/2005 | |
| JP | 2011-088541 A | 5/2011 | |
| JP | 2011-162073 A | 8/2011 | |
| JP | WO 2011104755 A1 * | 9/2011 | B60Q 5/008 |

* cited by examiner

FIG. 2
(a)
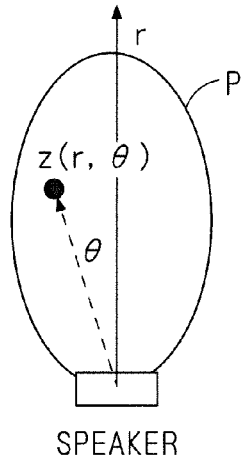
(b)
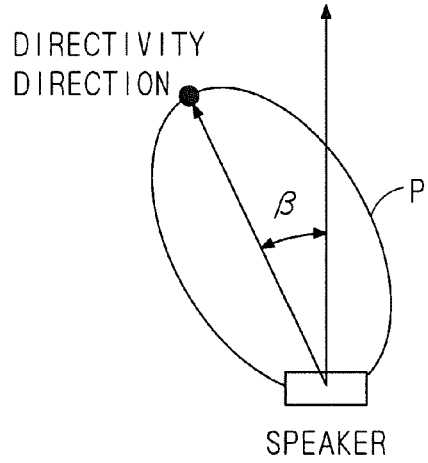
FIG. 3
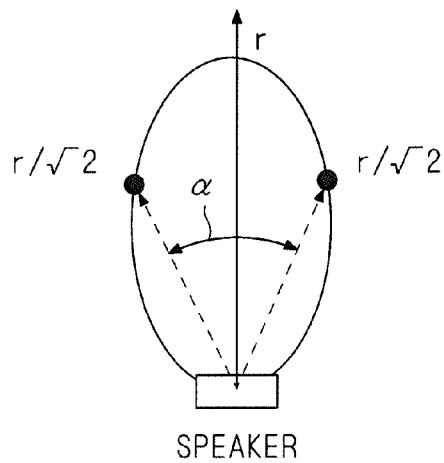

FIG. 8

| | NARROW DIRECTIVITY | WIDE DIRECTIVITY |
|---|---|---|
| NEAR DISTANCE | SOUND IS HARDLY HEARD ON PERIPHERY AREA | SOUND IS HEARD ON PERIPHERY AREA |
| FAR DISTANCE | SOUND IS HEARD ON FAR SIDE | SOUND IS NOT FAR-REACHING |

FIG. 12
(a)
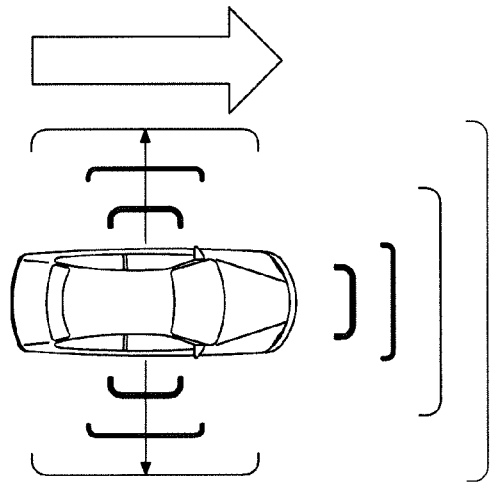
(b)
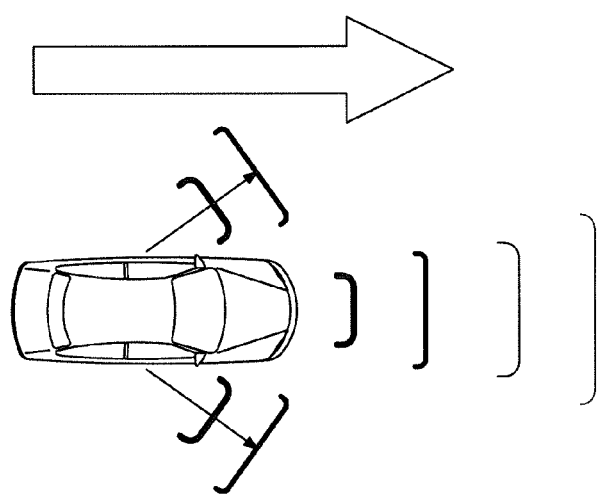
(c)
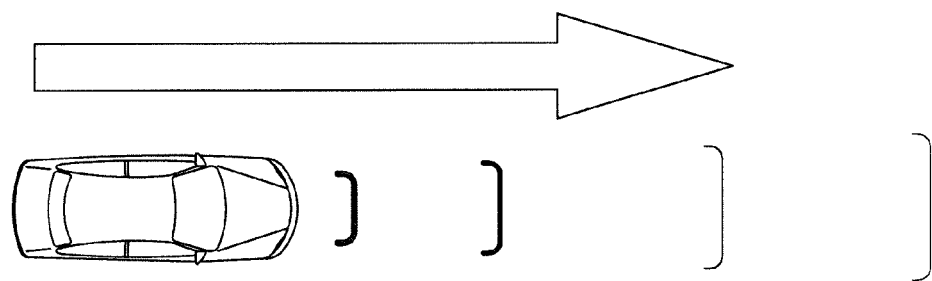

FIG. 13

| | LATERAL VEHICLE APPROACH NOTIFICATION SOUND | FRONT VEHICLE APPROACH NOTIFICATION SOUND |
|---|---|---|
| SPEED : SLOW | LATERAL DIRECTIVITY | WIDE DIRECTIVITY |
| SPEED : SLIGHTLY SLOW | FRONT DIRECTIVITY | SLIGHTLY WIDE DIRECTIVITY |
| SPEED : FAST | NONE | NARROW DIRECTIVITY |

VEHICLE APPROACH NOTIFICATION SOUND GENERATING APPARATUS

TECHNICAL FIELD

The present invention relates to a vehicle approach notification sound generating apparatus that generates a vehicle approach notification sound for notifying pedestrians of approach of vehicles.

BACKGROUND ART

Conventionally, electric vehicles and hybrid vehicles are provided with a vehicle approach notification sound generating apparatus that generates a pseudo sound (vehicle approach notification sound) in order to make pedestrians recognize approach of own vehicles, and an example of the apparatus is a vehicle approach notification sound generating apparatus that controls a reach distance of a vehicle approach notification sound according to a vehicle speed (for example, see Patent Document 1).

In Patent Document 1, when a vehicle travels at a high speed, a vehicle approach notification sound is switched into a high tone so that a reach distance is lengthened. On the other hand, when the vehicle travels at a low speed, the vehicle approach notification sound is switched into a low tone so that the reach distance is shortened.

PRIOR ART DOCUMENT

Patent Document

Patent Document 1: Japanese Patent Application Laid-Open No. 2011-162073

SUMMARY OF INVENTION

Problems to be Solved by the Invention

However, in Patent Document 1, only the reach distance of the vehicle approach notification sound is changed according to the vehicle speed, but a breadth (width) of directivity of the vehicle approach notification sound is not changed. Therefore, when a vehicle travels at a low speed, for example, pedestrians present around the vehicle is not securely notified by a vehicle approach notification sound. Further, pedestrians present on the lateral side of a roadway (for example, on a sidewalk) are not securely notified by a vehicle approach notification sound.

The present invention is devised in order to solve these problems, and its object is to provide a vehicle approach notification sound generating apparatus that is capable of generating a vehicle approach notification sound to a suitable range according to a vehicle speed.

Means for Solving the Problems

In order to solve the above problems, a vehicle approach notification sound generating apparatus of the present invention is characterized by including a vehicle speed calculating unit that calculates a vehicle speed, a vehicle approach notifying unit that outputs a vehicle approach notification sound for notifying of approach of the vehicle, and a controller that controls a directivity angle width representing a breadth of directivity of the vehicle approach notification sound or a directivity direction of the vehicle approach notification sound, wherein the controller makes control so that as the speed calculated by the vehicle speed calculating unit is faster, the directivity angle width of the vehicle approach notification sound to be output in an advancing direction of the vehicle is narrower, and controls the directivity angle width or the directivity direction so that when the vehicle travels at a current speed, the vehicle approach notification sound is output, at a sound pressure that is equal to or higher than a predetermined sound pressure, to a pedestrian present in a range that enables the pedestrian to move into a path of the vehicle.

Effect of the Invention

According to the present invention, a vehicle speed calculating unit that calculates a vehicle speed, a vehicle approach notifying unit that outputs a vehicle approach notification sound for notifying of approach of the vehicle, and a controller that controls a directivity angle width representing a breadth of directivity of the vehicle approach notification sound or a directivity direction of the vehicle approach notification sound are provided. Since the controller makes control so that as the speed calculated by the vehicle speed calculating unit is faster, the directivity angle width of the vehicle approach notification sound to be output in an advancing direction of the vehicle is narrower, and controls the directivity angle width or the directivity direction so that when the vehicle travels at a current speed, the vehicle approach notification sound is output, at a sound pressure that is equal to or higher than a predetermined sound pressure, to a pedestrian present in a range that enables the pedestrian to move into a path of the vehicle, the vehicle approach notification sound can be generated in a suitable range according to the vehicle speed.

The purpose, features, aspects, and advantages of the present invention will become more apparent from the detailed description and the accompanying drawings below.

BRIEF DESCRIPTION OF DRAWINGS

FIG. 2 is a diagram describing directivity of the vehicle approach notification sound according to the first embodiment of the present invention;

FIG. 3 is a diagram describing the directivity of the vehicle approach notification sound according to the first embodiment of the present invention;

FIG. 8 is a diagram illustrating a relationship between a distance from the vehicle and the directivity according to the first embodiment of the present invention;

FIG. 12 is a diagram illustrating the relationship between the vehicle speed and the directivity according to the second embodiment of the present invention;

FIG. 13 is a diagram illustrating a relationship between the vehicle speed and the directivity of the vehicle approach notification sound according to the second embodiment of the present invention;

DESCRIPTION OF EMBODIMENTS

Embodiments of the present invention are described below with reference to the drawings.

First Embodiment

A constitution of a vehicle approach notification sound generating apparatus according to the first embodiment of the present invention is described. In the first embodiment, a vehicle approach notification sound includes not only a pseudo sound of an engine sound of a conventional gasoline vehicle but also all sounds that can be used for notifying of approach of vehicles such as a warning sound (artificial sound) at time when a train approaches on a platform and music. Further, the vehicle approach notification sound generating apparatus according to the first embodiment is assumed to be mounted to vehicles such as electric vehicles or hybrid vehicles whose traveling sounds are low.

Figure 1:
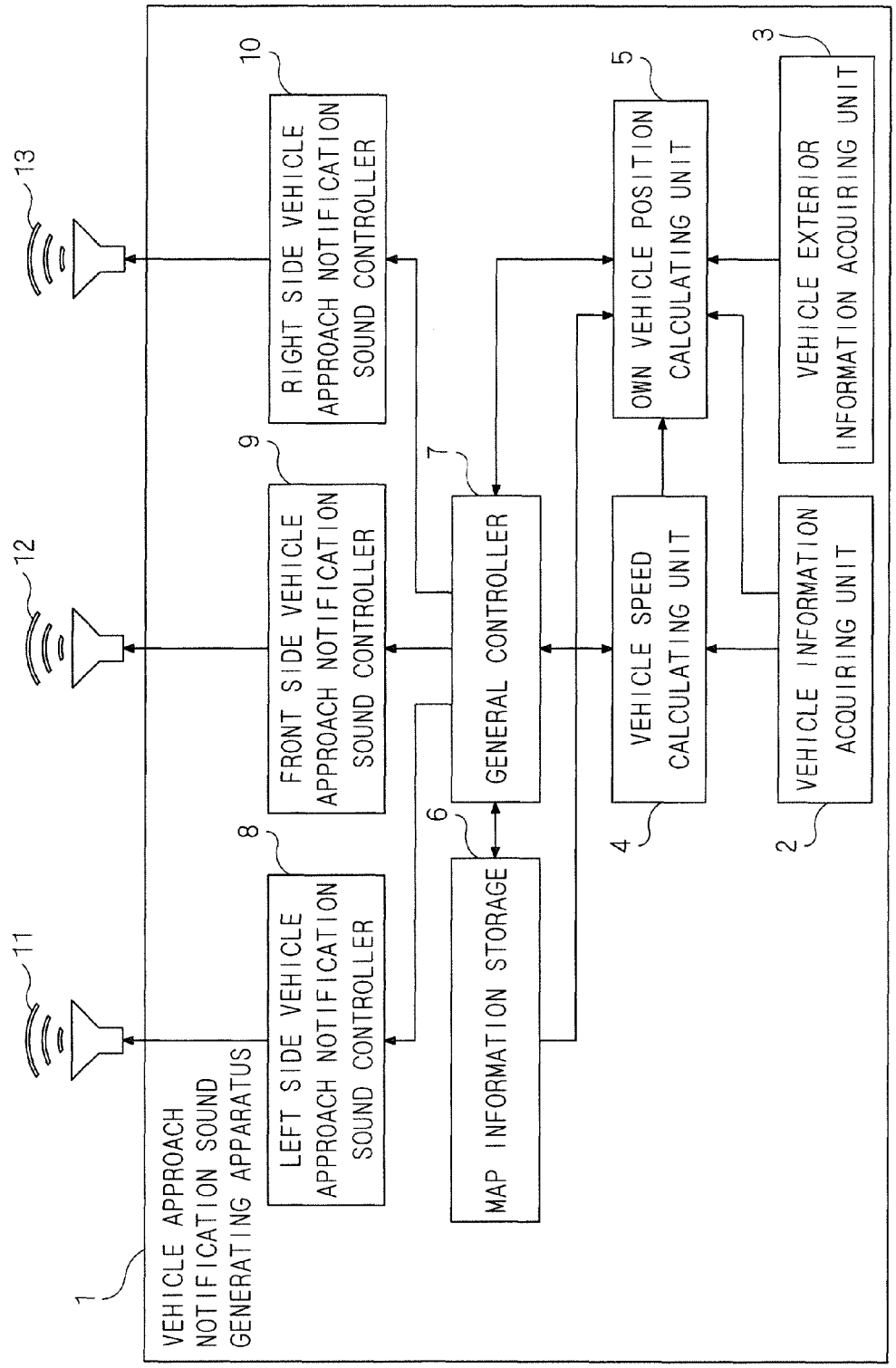
FIG. 1 is a block diagram illustrating one example of a constitution of a vehicle approach notification sound generating apparatus according to a first embodiment of the present invention.

FIG. 1 is a block diagram illustrating one example of the constitution of the vehicle approach notification sound generating apparatus 1 according to the first embodiment.

As shown in FIG. 1, the vehicle approach notification sound generating apparatus 1 has a vehicle information acquiring unit 2, a vehicle exterior information acquiring unit 3, a vehicle speed calculating unit 4, an own vehicle position calculating unit 5, a map information storage 6, a general controller 7, a left side vehicle approach notification sound controller 8, a front side vehicle approach notification sound controller 9, and a right side vehicle approach notification sound controller 10. Further, the left side vehicle approach notification sound controller 8 is connected to a vehicle external speaker 11, the front side vehicle approach notification sound controller 9 is connected to a vehicle external speaker 12, and the right side vehicle approach notification sound controller 10 is connected to a vehicle external speaker 13.

The vehicle information acquiring unit 2 acquires the various information (hereinafter, vehicle information) about a vehicle such as a wheel rotation pulse (vehicle speed pulse) and a steering angle of a steering wheel via an in-vehicle LAN, and inputs the information into the vehicle speed calculating unit 4 and the own vehicle position calculating unit 5.

The vehicle exterior information acquiring unit 3 acquires various information (hereinafter, vehicle external information) such as position information about a vehicle through GPS and information about camera images around the vehicle from the outside of the vehicle.

The vehicle speed calculating unit 4 calculates a vehicle speed (vehicle speed) based on the vehicle information input from the vehicle information acquiring unit 2.

The own vehicle position calculating unit 5 calculates a position of the vehicle (own vehicle) on a map based on the vehicle information input from the vehicle information acquiring unit 2, the vehicle exterior information acquired by the vehicle exterior information acquiring unit 3, the vehicle speed calculated by the vehicle speed calculating unit 4, and the map information stored in the map information storage 6.

The map information storage 6 stores at least map information about a periphery of the own vehicle.

The general controller 7 controls a directivity angle width representing the width of the directivity of vehicle approach notification sound, or a directivity direction of the vehicle approach notification sound, and controls the left side vehicle approach notification sound controller 8, the front side vehicle approach notification sound controller 9, and the right side vehicle approach notification sound controller 10 so that a vehicle approach notification sound is generated (output) with the controlled directivity angle width or in directivity direction. The directivity of the vehicle approach notification sound is described in detail later.

The left side vehicle approach notification sound controller 8, the front side vehicle approach notification sound controller 9, and the right side vehicle approach notification sound controller 10 generate vehicle approach notification sound signals, respectively, based on control (instruction) of the general controller 7, and transmit the generated vehicle approach notification sound signals to the vehicle external speakers 11 to 13.

The vehicle external speakers 11 to 13 (vehicle approach notifying unit) receive the vehicle approach notification sound signals from the left side vehicle approach notification sound controller 8, the front side vehicle approach notification sound controller 9, and the right side vehicle approach notification sound controller 10, and output (notify) them as vehicle approach notification sounds to the outside of the vehicle. The vehicle external speaker 11 is provided to the left side with respect to the advancing direction of the vehicle, and the vehicle external speaker 12 is provided to the front side of the vehicle, and the vehicle external speaker 13 is provided to the right side with respect to the advancing direction of the vehicle.

The vehicle approach notification sounds output from the vehicle external speakers 11 and 13 are termed lateral vehicle approach notification sounds, and the vehicle approach notification sound output from the vehicle external speaker 12 is termed a front vehicle approach notification sound. Further, in the first embodiment, directivity speakers typified by, for example, parametric speakers, which can arbitrarily control directivity from the outside, are used as the vehicle external speakers 11 to 13.

The directivity of the vehicle approach notification sound in the first embodiment is described.

FIG. 2 is a diagram for describing the directivity of the vehicle approach notification sound, and illustrates one example of a method for expressing the directivity.

The directivity means characteristics of the intensity of the vehicle approach notification sound with respect to a direction. As shown in FIG. 2, P represents the same sound pressure in each direction. Further, in a range surrounded by P, a sound pressure p(r, θ) of a point z(r, θ) represented by a polar coordinate system is a sound pressure p(r, θ)≥P.

In order to simplify the description in the first embodiment, the directivity of the speaker (the vehicle external speakers 11 to 13) is symmetrical, and the sound pressure monotonously decreases in a direction having the maximum sound pressure (in a portion (a) of FIG. 2, the front direction of the speaker), and the direction where the sound pressure is the maximum is defined as the directivity direction. For example, P shown in FIG. 2 is aggregate of points where a sound pressure of 70 dB is generated from the speaker when a predetermined electric current is allowed to flow. The directivity direction of the speaker shown in the portion (a) of FIG. 2 is a direction of 0° with respect to the front direction, and the directivity direction of the speaker shown in a portion (b) of FIG. 2 is a direction of β° with respect to the front direction.

Although the directivity of a sound output from the speaker generally varies depending on a frequency, the directivity is uniform regardless of a frequency for convenience of the description in the first embodiment. Further, although the sound pressure is an integral value of powers in respective frequencies in an audible range, sensitivity of human auditory sense varies depending on the frequencies, and thus the sound pressure P is acquired by addition of a sensitivity curve. When the sensitivity curve that is normalized with the maximum value being 1 is determined as Fa(f), the frequency characteristic of the vehicle approach notification sound is determined as Fb(f), and f is the frequency, $P=\int Fa(f)\cdot Fb(f)df, f=0\sim 20$ kHz An A curve, a B curve, and a C curve are defined as curves of the sensitivity with respect to a noise for Fa(f), but the A curve is employed here.

The powers of the respective frequencies in the audible range may be calculated with the audible range being narrowed to a predetermined frequency range of 300 Hz to 3 kHz.

FIG. 3 is a diagram for describing a directivity angle width. The directivity direction of the speaker shown in FIG. 3 is the direction of 0° with respect to the front direction.

"The directivity is narrow" means that the vehicle approach notification sound propagates to a narrow range, and "the directivity is wide" means that the vehicle approach notification sound propagates to a wide range. In the first embodiment, the breadth of the directivity is termed the directivity angle width. For example, as shown in FIG. 3, the directivity angle width α is defined as a right and left angle width whose center axis is a front direction when a distance having the same sound pressure as the sound pressure in the directivity direction becomes 1/√2.

Figure 4:
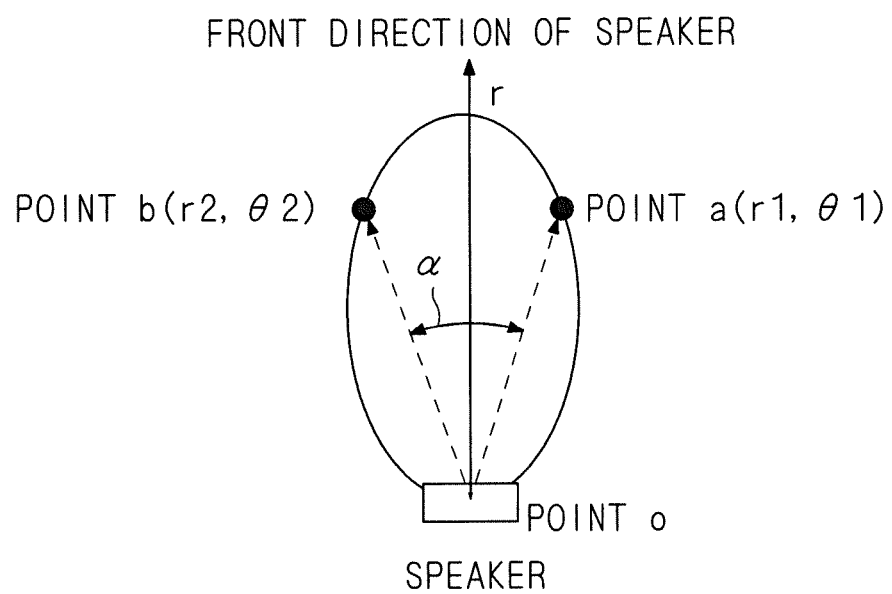
FIG. 4 is a diagram describing the directivity of the vehicle approach notification sound according to the first embodiment of the present invention.

Further, the directivity angle width α is the angle width when the distance is 1/√2 based on the distance in the directivity direction, but is not limited to this. For example, as shown in FIG. 4, right and left angles (θ2, θ1) of the directivity direction at time of ½ with respect to an entire area S of the power based on the directivity direction (an area in the range surrounded by an oval in FIG. 4) are acquired, and a difference between the right and left angles (θ2-θ1) may be the directivity angle width α. That is to say, in FIG. 4, an area surrounded by a straight line o-a, a curved line a-b, and a straight line b-o is ½ of the entire area S.

Since the directivity of the vehicle approach notification sound is uneven or asymmetrical with respect to the directivity direction, the sound pressure does not necessarily monotonously decrease from the direction of the maximum sound pressure. In such a case, the directivity angle width may be acquired based on the entire area of the power.

An entire operation of the vehicle approach notification sound generating apparatus 1 according to the first embodiment is described below.

Figure 5:
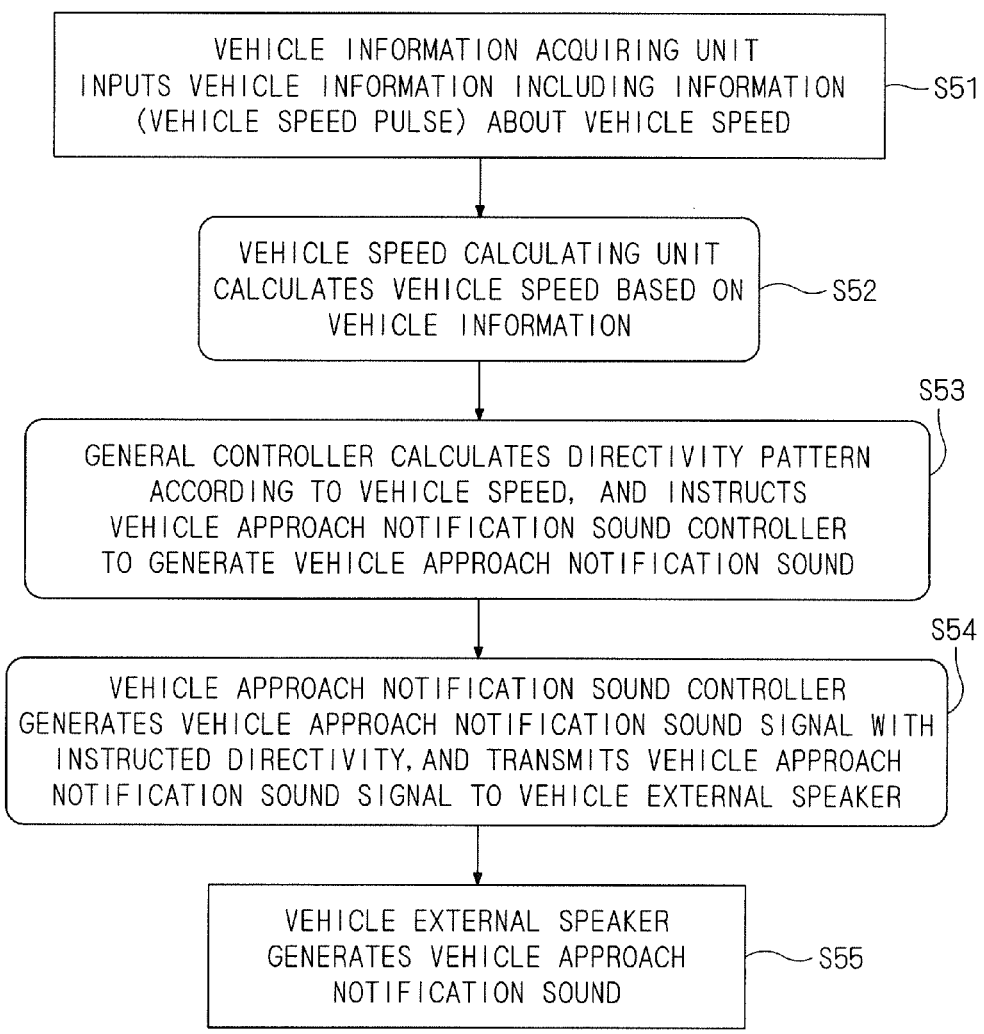
FIG. 5 is a flowchart illustrating one example of an entire operation of the vehicle approach notification sound generating apparatus according to the first embodiment of the present invention.

FIG. 5 is a flowchart illustrating one example of the entire operation of the vehicle approach notification sound generating apparatus 1.

The vehicle information acquiring unit 2 inputs the vehicle information including information about a vehicle speed such as a vehicle speed pulse into the vehicle speed calculating unit 4 at step S51.

The vehicle speed calculating unit 4 calculates a vehicle speed based on the vehicle information input from the vehicle information acquiring unit 2 at step S52.

The general controller 7 calculates a directivity pattern of the vehicle approach notification sound according to the vehicle speed calculated by the vehicle speed calculating unit 4, and instructs (controls) the left side vehicle approach notification sound controller 8, the front side vehicle approach notification sound controller 9, and the right side vehicle approach notification sound controller 10 so that the vehicle approach notification sound is generated in the calculated directivity pattern at step S53. The directivity pattern of the vehicle approach notification sound may be calculated based on a table related to the vehicle speeds or by a predetermined formula.

The left side vehicle approach notification sound controller 8, the front side vehicle approach notification sound controller 9, and the right side vehicle approach notification sound controller 10 generate vehicle approach notification sound signals, respectively, based on directivity instructed by the general controller 7, and transmit the generated vehicle approach notification sound signals to the vehicle external speakers 11 to 13 at step S54.

The vehicle external speakers 11 to 13 receive the vehicle approach notification sound signals from the left side vehicle approach notification sound controller 8, the front side vehicle approach notification sound controller 9, and the right side vehicle approach notification sound controller 10, respectively, and generate (output) vehicle approach notification sounds based on the received vehicle approach notification sound signals at step S55.

An operation of the general controller 7 in a case where the vehicle approach notification sound is generated in the front direction is described below. The vehicle approach notification sound is generated from the vehicle external speaker 12.

Figure 6:
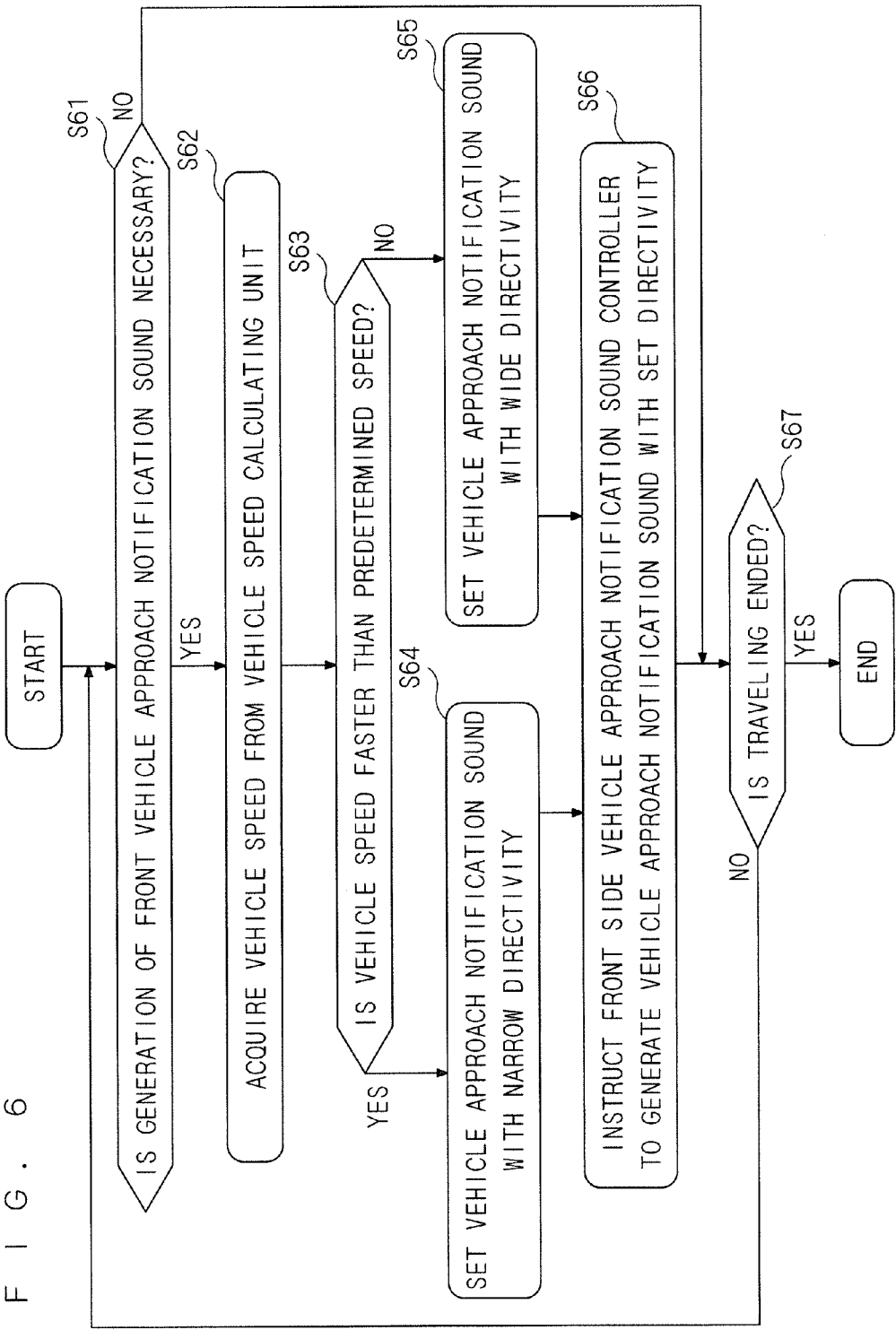
FIG. 6 is a flowchart illustrating one example of an operation of a general controller according to the first embodiment of the present invention.

FIG. 6 is a flowchart illustrating one example of the operation of the general controller 7.

A decision is made whether the front vehicle approach notification sound should be generated from the vehicle external speaker 12 at step S61. When the generation of the front vehicle approach notification sound is necessary, the sequence goes to step S62. On the other hand, when the generation of the front vehicle approach notification sound is unnecessary, the sequence goes to step S67.

For example, when the vehicle is traveling on an expressway, pedestrians to be notified are not present, and thus the determination is made that the generation of the vehicle approach notification sound is unnecessary. On the other hand, when the vehicle is traveling on a general road, pedestrians to be notified are likely to be present, and thus the decision is made that the generation of the vehicle approach notification sound is necessary. The road where the vehicle is traveling can be known based on the position of the vehicle (own vehicle) calculated by the own vehicle position calculating unit 5.

Further, for example, when a hybrid vehicle is traveling using an engine, pedestrians to be notified hear the engine sound, and thus the decision is made that the generation of the vehicle approach notification sound is unnecessary.

The vehicle speed calculated by the vehicle speed calculating unit 4 is acquired from the vehicle speed calculating unit 4 at step S62.

A decision is made at step S63 whether the vehicle speed acquired from the vehicle speed calculating unit 4 is faster than a predetermined speed. When the decision is made that the vehicle speed is faster than the predetermined speed, the sequence goes to step S64. On the other hand, when the decision is made that the vehicle speed is slower than the predetermined speed, the sequence goes to step S65. A threshold of the vehicle speed at this time may be any value.

The vehicle approach notification sound is set to narrow directivity (narrow directivity angle width) at step S64.

The vehicle approach notification sound is set to wide directivity (wide directivity angle width) at step S65.

The front side vehicle approach notification sound controller 9 is instructed (controlled) at step S66 so that the vehicle approach notification sound of the directivity set at step S64 or step S65 is generated from the vehicle external speaker 12.

A decision is made at step S67 whether the traveling of the vehicle (own vehicle) is ended. When the decision is made that the traveling of the vehicle is ended, the process is ended. On the other hand, when the decision is made that the traveling of the vehicle is not completed, the sequence goes to step S61.

Figure 7:
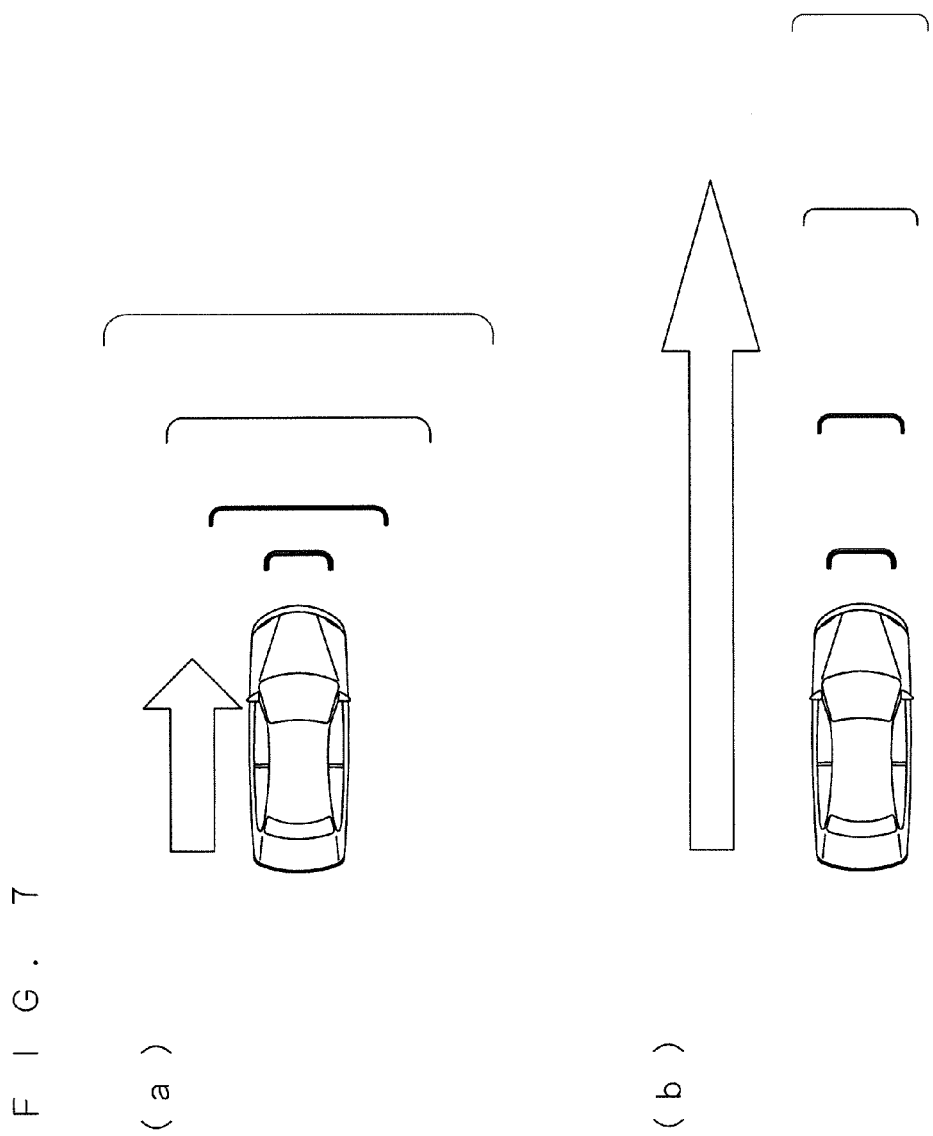
FIG. 7 is a diagram illustrating a relationship between the vehicle speed and the directivity according to the first embodiment of the present invention.

FIG. 7 is a diagram illustrating a relationship between the vehicle speed and the directivity of the vehicle approach notification sound based on the operation in FIG. 6. Further, FIG. 8 is a diagram illustrating a relationship between a distance from the vehicle and the directivity of the vehicle approach notification sound. In FIG. 7, a plurality of lines shown on the front side of the vehicle typically shows a state that the front vehicle approach notification sound generated (output) from the vehicle propagates. Further, a length of an arrow shows the speed of the vehicle, and as the length is longer, the speed is faster.

As shown in a portion (a) of FIG. 7, when the vehicle speed is slow, the vehicle approach notification sound of the wide directivity (the wide directivity angle width) is output.

On the other hand, as shown in a portion (b) of FIG. 7, when the vehicle speed is fast, the vehicle approach notification sound of the narrow directivity (narrow the directivity angle width) is output. That is to say, the general controller 7 makes control so that as the vehicle speed is faster, the directivity angle width of the vehicle approach notification sound to be output to the advancing direction of the vehicle is narrower.

As shown in FIG. 8, in the case of the narrow directivity, the vehicle approach notification sound is hardly heard around a near distance from the vehicle, but can be heard at a great distance. Further, in the case of the wide directivity, the vehicle approach notification sound can be heard around the near distance from the vehicle, but cannot be heard at a great distance.

Accordingly, when the vehicle speed is slow, the vehicle approach notification sound is output so as to be capable of being heard by pedestrians present around the near distance from the vehicle. For this reason, the pedestrians can recognize that the vehicle approaches, and can avoid contact with the vehicle. At this time, since the vehicle is unlikely to contact with pedestrians present far (at a far distance), the vehicle approach notification sound is not transmitted to the far distance.

On the other hand, when the vehicle speed is fast, the vehicle approach notification sound is made to approach the pedestrians present at the far distance. For this reason, the pedestrians can recognize that the vehicle approaches, and can avoid the contact with the vehicle. At this time, since the vehicle is unlikely to contact with pedestrians present around a near distance (the vehicle passes before contact), the vehicle approach notification sound is made to be hardly heard around the near distance.

Therefore, the vehicle approach notification sound is output only to a range where the notification is necessary, and the vehicle approach notification sound is not output to a range where the notification is unnecessary, and thus the vehicle approach notification sound can be effectively output (notified). Further, a problem of a noise due to the vehicle approach notification sound can be reduced in comparison with a case where the vehicle approach notification sound is generated in the directivity angle width regardless of the vehicle speed.

Further, the general controller 7 may control the directivity angle width with an output energy of the vehicle approach notification sound being constant. As a result, waste of energy can be avoided.

Figure 9:
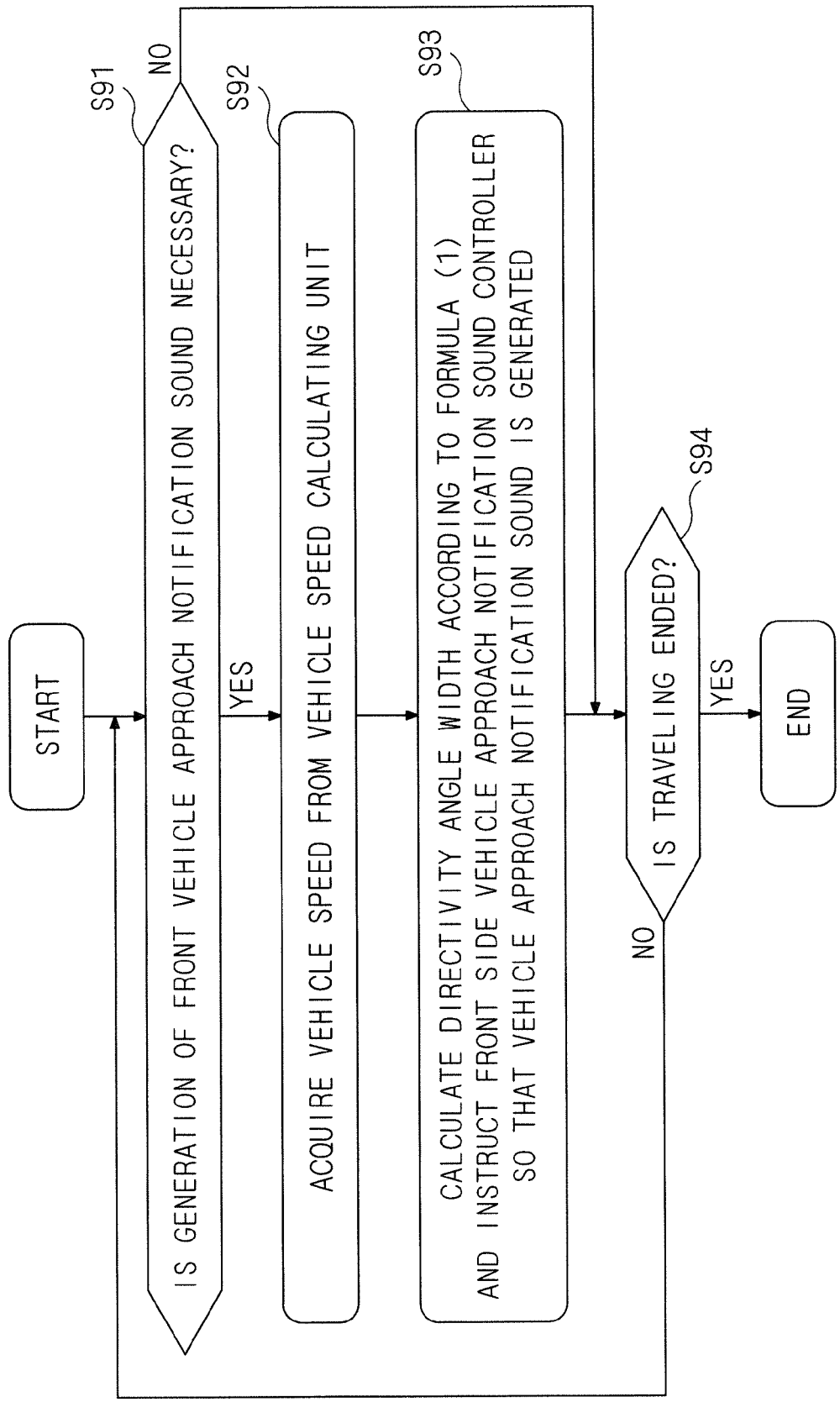
FIG. 9 is a flowchart illustrating one example of the operation of the general controller according to the first embodiment of the present invention.

FIG. 9 is a flowchart illustrating another example of the operation of the general controller 7. In FIG. 6, the directivity of the front vehicle approach notification sound (the directivity angle width) is set based on the threshold according to the vehicle speed, but in FIG. 9, the directivity angle width of the front vehicle approach notification sound is changed continuously with respect to the vehicle speed. That is to say, the directivity angle width of the vehicle approach notification sound shown in the portions (a) and (b) of FIG. 7 changes continuously according to the vehicle speed.

A decision is made at step S91 whether the front vehicle approach notification sound should be generated from the vehicle external speaker 12. The process at step S91 corresponds to the process at step S61 in FIG. 6. When the generation of the front vehicle approach notification sound is necessary, the sequence goes to step S92. On the other hand, when the generation of the front vehicle approach notification sound is unnecessary, the sequence goes to step S94.

The vehicle speed calculated by the vehicle speed calculating unit 4 is acquired from the vehicle speed calculating unit 4 at step S92.

The directivity angle width is calculated according to the following formula (1), and the front side vehicle approach notification sound controller 9 is instructed so as to generate vehicle approach notification sound at step S93.

A decision is made at step S94 whether the traveling of the vehicle (own vehicle) is ended. When the decision is made that the traveling of the vehicle is ended, the process is ended. On the other hand, when the decision is made that the traveling of the vehicle is not ended, the sequence goes to step S91.

Figure 10:
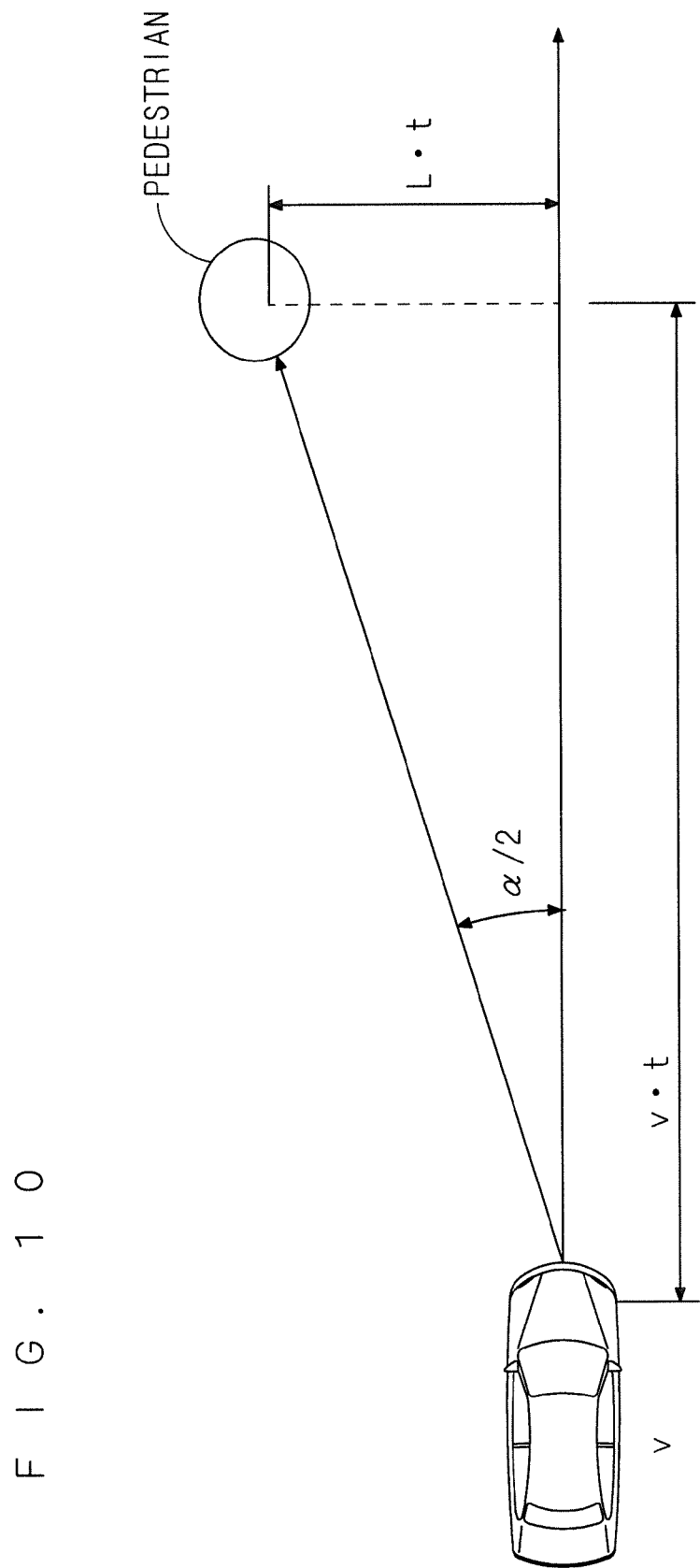
FIG. 10 is a diagram describing calculation of a directivity angle width according to the first embodiment of the present invention.

Concretely, as shown in FIG. 10, the directivity angle width is represented by $\alpha=f(v)$, the vehicle speed is represented by v (per second), and the speed of pedestrian is determined by L (per second), and the directivity angle width, which disables the pedestrian who hears the vehicle approach notification sound of 70 dB to move to the center position of the vehicle after t second even when the pedestrian advances to the vehicle direction, is set. That is to say, the directivity angle width of the vehicle approach notification sound is obtained by the following formula (1).

$$\tan(\alpha/2) = (L \cdot t)/(v \cdot t) = L/v$$

$$\alpha/2 = \tan^{-1}(L/v)$$

$$\alpha = 2\tan^{-1}(L/v)$$

When L=5(m/sec.), $$\alpha = 2\tan^{-1}(5/v) \quad (1)$$

Regardless of the formula (1), the width of the vehicle or the width of a street may be considered, or the speed L of the pedestrian may be varied according to ages. For example, it is considered that the speed L of an aged person is small, and the speed L of a child is large. The ages of pedestrians may be determined by age recognition using an image processing apparatus provided to the vehicle or communication with wireless terminals of pedestrians so as to obtain information about the pedestrians.

Second Embodiment

The second embodiment of the present invention describes a case where a vehicle approach notification sound is generated laterally. Since the constitution and the operation of a vehicle approach notification sound generating apparatus according to second embodiment are similar to the first embodiment, description thereof is omitted. A vehicle approach notification sound is generated from vehicle external speakers 11 and 13 in second embodiment.

Figure 11:
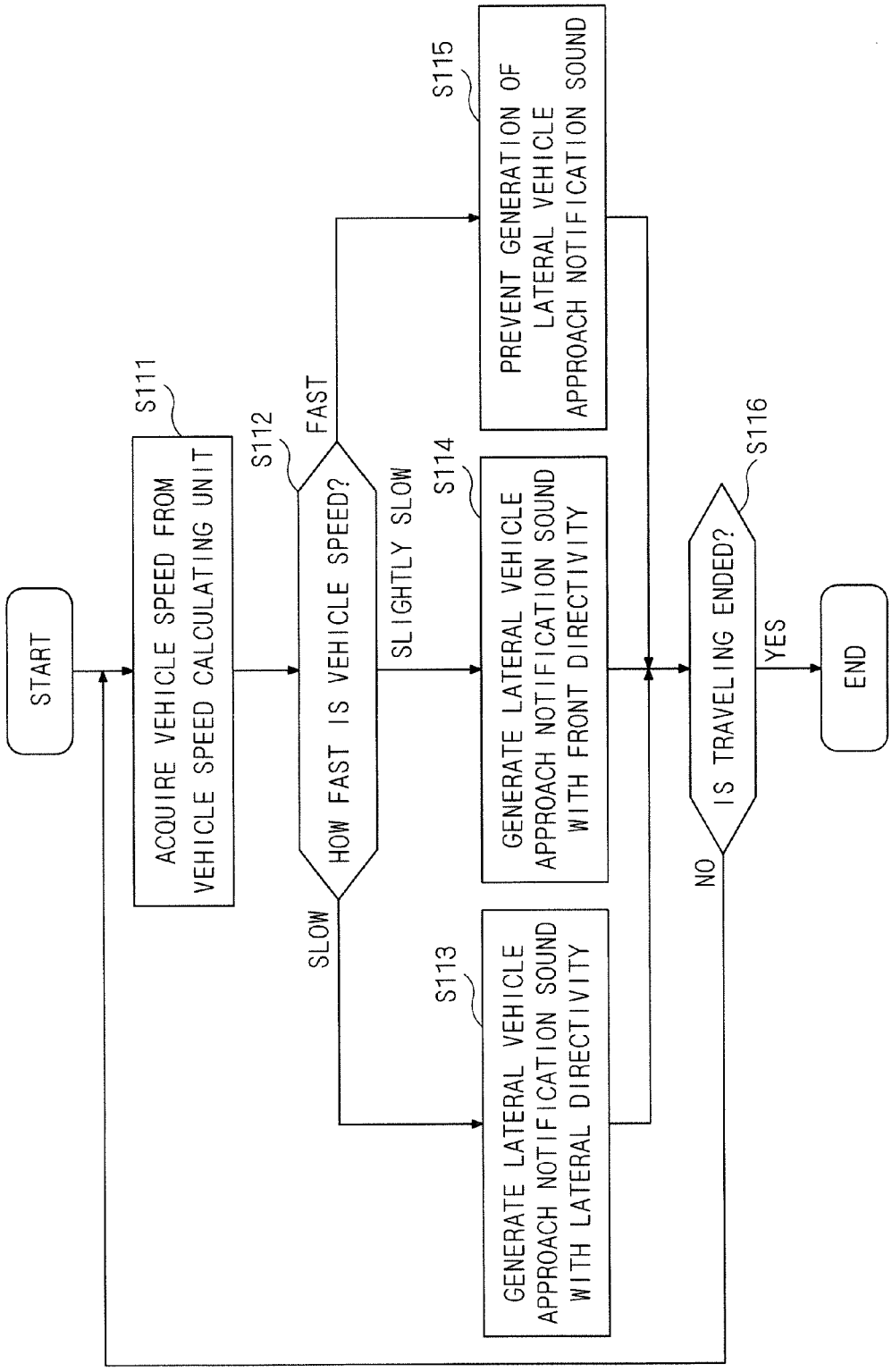
FIG. 11 is a flowchart illustrating one example of an operation of the general controller according to a second embodiment of the present invention.

FIG. 11 is a flowchart illustrating one example of the operation of a general controller 7.

A vehicle speed calculated by a vehicle speed calculating unit 4 is acquired from the vehicle speed calculating unit 4 at step S111.

A decision is made at step S112 whether the vehicle speed acquired from the vehicle speed calculating unit 4 is "slow", "slightly slow" or "fast". When the decision is made that the vehicle speed is "slow", the sequence goes to step S113, and that the vehicle is "slightly slow", the sequence goes to step S114. When the decision is made that the vehicle speed is "fast", the sequence goes to step S115. The vehicle speed "slow" is less than, for example, 30 km/h, the vehicle speed "slightly slow" is, for example, 30 to 50 km/h, and the vehicle speed "fast" is, for example, 50 km/h or more. A threshold of the vehicle speed at this time is not limited to the above value and may be any value.

The vehicle approach notification sound is generated toward the lateral sided at step S113. That is to say, when the vehicle speed is "slow", the vehicle approach notification sound is generated in a direction perpendicular to the advancing direction of the vehicle.

The vehicle approach notification sound is generated toward a front side at step S114. That is to say, when the vehicle speed is "slightly slow", the vehicle approach notification sound is generated to a front-diagonal direction from the direction perpendicular to the advancing direction of the vehicle (for example, a direction of 45°).

The vehicle approach notification sound is not generated at step S115. That is to say, when the vehicle speed is "fast", the vehicle approach notification sound is not generated.

After step S113, step S114, and step S115, the sequence goes to step S116.

A decision is made at step S116 whether the traveling of the vehicle (own vehicle) is ended. When the decision is made that the traveling of the vehicle is ended, the process is ended. On the other hand, when the decision is made that the traveling of the vehicle is not ended, the sequence goes to step S111.

The general controller 7 makes control so that only when the vehicle speed (vehicle speed) calculated by the vehicle speed calculating unit 4 is a predetermined speed or less, the vehicle approach notification sound is output.

FIGS. 12 and 13 are diagrams illustrating a relationship between the vehicle speed and the directivity of the vehicle approach notification sound based on the operation in FIG. 11. In FIG. 12, a plurality of lines shown on the front side or the lateral side of the vehicle typically shows a state that the vehicle approach notification sound generated (output) from the vehicle propagates. Further, a length of an arrow shows the speed of the vehicle, and as the length is longer, the speed is faster. Since the directivity of the vehicle approach notification sound output to the front side of the vehicle is determined according to the process shown in FIG. 6 or FIG. 9, detailed description thereof is omitted.

As shown in a portion (a) of FIG. 12, when the vehicle speed is "slow", the vehicle approach notification sound is generated toward the direction perpendicular to the advancing direction of the vehicle. Therefore, pedestrians present around the near distance from the vehicle can recognize that the vehicle approaches, and thus the contact with the vehicle can be avoided.

Further, as shown in a portion (b) of FIG. 12, when the vehicle speed is "slightly slow", the vehicle approach notification sound is generated toward the front-diagonal direction from the direction perpendicular to the advancing direction of the vehicle (for example, the direction of 45°). The reason why the vehicle approach notification sound is generated toward the front-diagonal direction is because even if a pedestrian present on a region of the direction perpendicular to the advancing direction of the vehicle recognizes the vehicle approach notification sound, the vehicle is likely to already pass before the pedestrian contacts with the vehicle, and the vehicle approach notification sound is made to be recognized only by a pedestrian who is likely to contact with the vehicle. As the vehicle speed calculated by the vehicle speed calculating unit 4 is faster, the vehicle external speakers 11 and 13 output the vehicle approach notification sound closer to the advancing direction of the vehicle.

Further, as shown in a portion (c) of FIG. 12, when the vehicle speed is "fast", the vehicle approach notification sound is not generated. This is because, in this case, even if the vehicle approach notification sound is generated laterally, the vehicle is likely to already pass before a pedestrian contacts with the vehicle.

The vehicle approach notification sound is generated in not only the front side but also the lateral side of the vehicle, so that the pedestrian can be made to surely recognize the vehicle approach notification sound, and can avoid the contact the vehicle. Further, since the vehicle approach notification sound is effectively output (generated), a problem of a noise due to the vehicle approach notification sound can be reduced.

Figure 14:
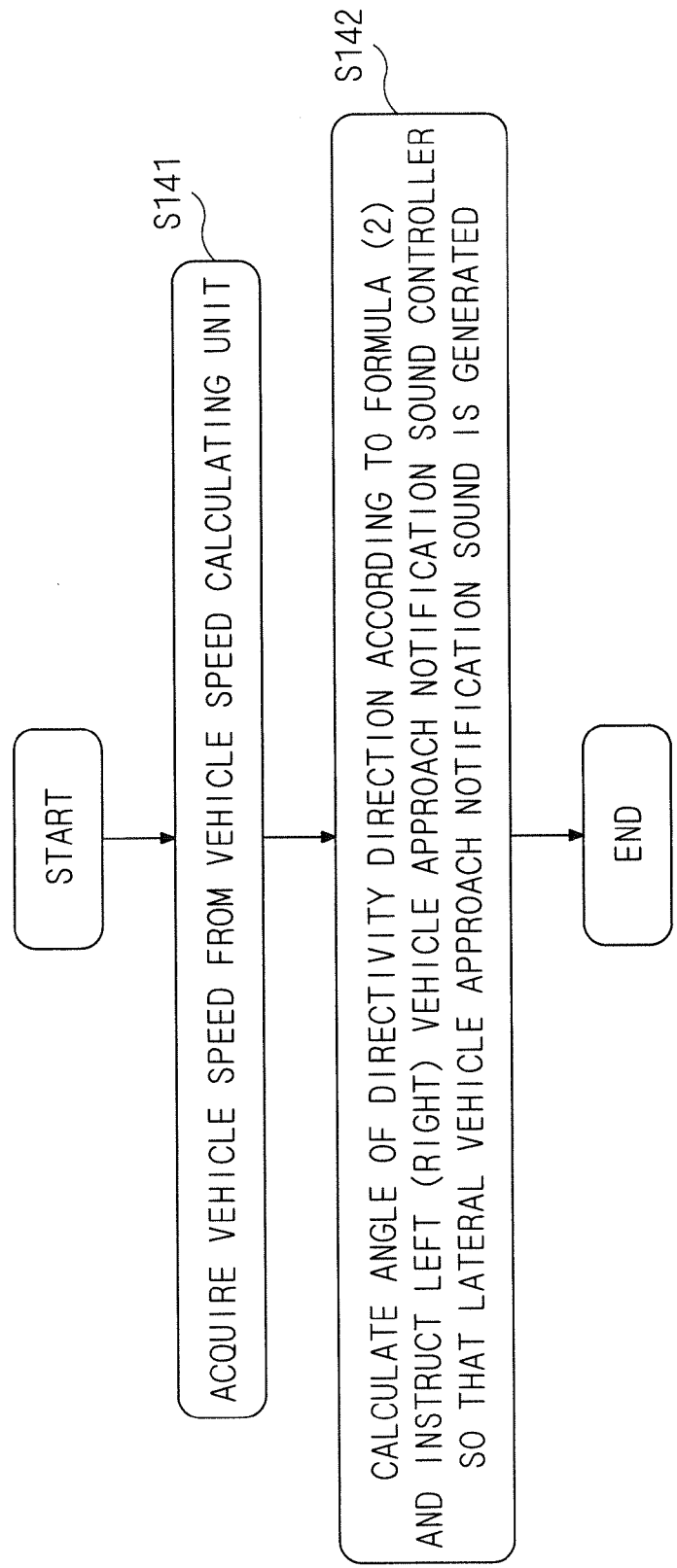
FIG. 14 is a flowchart illustrating one example of the operation of the general controller according to the second embodiment of the present invention.

FIG. 14 is a flowchart illustrating another example of the operation of the general controller 7. In FIG. 11, the directivity of the lateral vehicle approach notification sound (the directivity direction) is set based on the threshold according to the vehicle speed, but in FIG. 14, the directivity direction of the lateral vehicle approach notification sound is changed continuously with respect to the vehicle speed. That is to say, the directivity direction shown in the portions (a) to (c) of FIG. 12 continuously changes according to the vehicle speed.

The vehicle speed calculated by the vehicle speed calculating unit 4 is acquired from the vehicle speed calculating unit 4 at step S141.

The directivity angle is calculated according to the following formula (2), and a left side vehicle approach notification sound controller 8 and a right side vehicle approach notification sound controller 10 are instructed so as to generate vehicle approach notification sounds at step S142.

Figure 15:
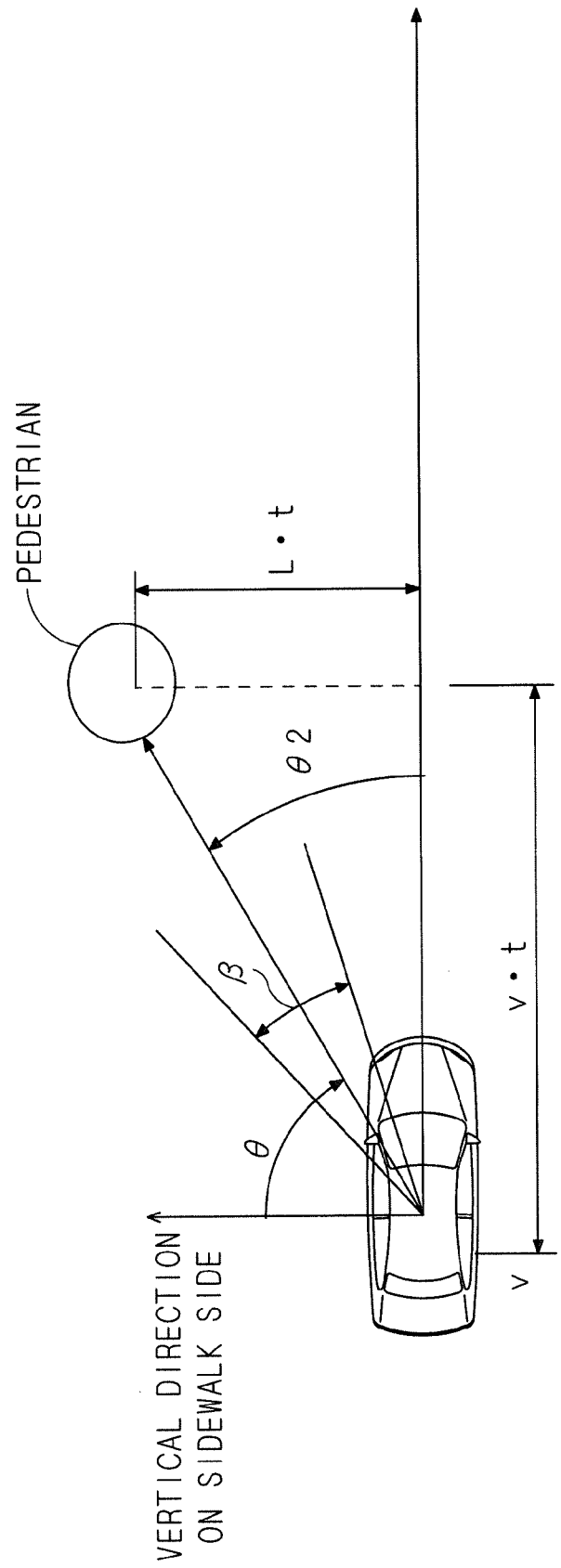
FIG. 15 is a diagram describing calculation of an angle of a directivity direction according to the second embodiment of the present invention.

Concretely, as shown in FIG. 15, the directivity angle is represented by θ, the directivity angle width is represented by β=h(v), the vehicle speed is represented by v (per second), and the speed of pedestrian is dented by L (per second), and the directivity angle width, which disables the pedestrian who hears the vehicle approach notification sound of 70 dB to move to the center position of the vehicle after t second even when the pedestrian advances to the vehicle direction, is set, and the lateral directivity angle width β is set as a margin with the directivity angle being the center.

$$θ2=\tan^{-1}(L/v)$$

$$θ=90°-θ2=90°-\tan^{-1}(L/v) \quad (2)$$

Further, the apparatus is designed so that the lateral directivity angle width β becomes 180° when the vehicle stops.

$$β=h(v)=180°·\cos(θ2)$$

$$=180°·\cos(\tan^{-1}(L/v)) \quad (3)$$

Not only the formula (3) but also a formula that accords with the design concept may be used. For example, the directivity angle width β may be set to a fixed value such as =30°.

The vehicle approach notification sound can be effectively generated in a suitable range according to the vehicle speed. Therefore, a problem of a noise can be reduced without generating an unnecessary vehicle approach notification sound. Further, the vehicle approach notification sound is generated in not only the front side but also the lateral side of the vehicle, so that the pedestrian can be made to surely recognize the vehicle approach notification sound, and can avoid the contact with the vehicle.

In the first embodiments 1 and 2, the directivity speakers that can arbitrarily control the directivity through external control are used as the vehicle external speakers 11 to 13, but a plurality of general acoustic speakers that are not the directivity speakers may be arranged so as to control spread of sounds using an acoustic lens. Further, the acoustic speakers may be physically moved so as to control output and direction of sounds.

Further, as shown in FIG. 12, the case where the vehicle approach notification sound is generated in the front direction and the lateral direction is described, but the present invention is not limited to this and the sound may be generated only in the lateral direction. However, it goes without saying that when the vehicle approach notification sound is generated in both the front and lateral sides of the vehicle, and pedestrians can be made to recognize the sounds more securely.

Further, as shown in FIG. 12, the case where the vehicle approach notification sound is generated from both the vehicle external speakers 11 and 13 is described, but the sound may be generated from any one of the vehicle external speaker 11 and the vehicle external speaker 13.

Further, in the method for changing the directivity direction shown in FIG. 12, the vehicle external speakers 11 and 13 may be physically moved so that the directivity direction is changed, and the directions of sounds may be changed by the directivity speakers.

In the present invention, the embodiments may be freely combined or suitably modified and omitted within the scope of the present invention.

The present invention is described in detail, but the above description is illustrative in all aspects, and the present invention is not limited to this. An infinite number of unillustrated modified examples can be assumed without deviation from the scope of the present invention.

EXPLANATION OF LETTERS OR NUMERALS

1: vehicle approach notification sound generating apparatus, 2: vehicle information acquiring unit, 3: vehicle exterior information acquiring unit, 4: vehicle speed calculating unit, 5: own vehicle position calculating unit, 6: map information storage, 7: general controller, 8: left side vehicle approach notification sound controller, 9: front side vehicle approach notification sound controller, 10: right side vehicle approach notification sound controller, 11 to 13: vehicle external speaker.

The invention claimed is:

1. A vehicle approach notification sound generating apparatus comprising:
   a vehicle speed calculating unit that calculates a vehicle speed;
   a vehicle approach notifying unit that outputs a vehicle approach notification sound for notifying of approach of the vehicle; and
   a controller that controls a directivity angle width representing a breadth of directivity of said vehicle approach notification sound and a directivity direction of said vehicle approach notification sound,
   wherein said controller makes control so that as said speed calculated by said vehicle speed calculating unit is faster, said directivity angle width of said vehicle approach notification sound to be output in an advancing direction of said vehicle is narrower, and controls said directivity angle width or said directivity direction so that when said vehicle travels at a current speed, said vehicle approach notification sound is output, at a sound pressure that is equal to or higher than a predetermined sound pressure, to a pedestrian present in a range that enables the pedestrian to move into a path of said vehicle,
   wherein said controller controls said vehicle approach notifying unit;
      to output said vehicle approach notification sound only in said advancing direction of said vehicle when the calculated vehicle speed is above a first predetermined speed;
      to output said vehicle approach notification sound in said advancing direction of said vehicle and separately in an oblong sideway-advancing direction when the calculated vehicle speed is below said first predetermined speed but above a second predetermined speed; and
      to output said vehicle approach notification sound in a sideway direction perpendicular to said advancing direction of said vehicle when said calculated vehicle speed is at said second predetermined speed or slower.

2. A vehicle approach notification sound generating apparatus comprising:
- a vehicle speed calculating unit that calculates a vehicle speed;
- a vehicle approach notifying unit that outputs a vehicle approach notification sound for notifying of approach of the vehicle; and
- a controller that controls a directivity angle width representing a breadth of directivity of said vehicle approach notification sound and a directivity direction of said vehicle approach notification sound, wherein said controller makes control so that as said speed calculated by said vehicle speed calculating unit is faster, said directivity angle width of said vehicle approach notification sound to be output in an advancing direction of said vehicle is narrower, and controls said directivity angle width or said directivity direction so that when said vehicle travels at a current speed, said vehicle approach notification sound is output, at a sound pressure that is equal to or higher than a predetermined sound pressure, to a pedestrian present in a range that enables the pedestrian to move into a path of said vehicle,
- wherein said controller controls said vehicle approach notifying unit:
  - to output said vehicle approach notification sound only in said advancing direction of said vehicle when the calculated vehicle speed is above a first predetermined speed;
  - to output said vehicle approach notification sound in said advancing direction of said vehicle and separately in an oblong sideway-advancing direction when the calculated vehicle speed is below said first predetermined speed but above a second predetermined speed; and
  - to output said vehicle approach notification sound in a sideway direction perpendicular to said advancing direction of said vehicle when said calculated vehicle speed is at said second predetermined speed or slower; and
- said controller controls said directivity angle width based on a speed of a pedestrian present in the advancing direction of said vehicle.

3. The vehicle approach notification sound generating apparatus according to claim 1, wherein said controller determines whether said vehicle approach notification sound should be generated based on a road where said vehicle is currently traveling.

4. The vehicle approach notification sound generating apparatus according to claim 2, wherein said controller controls said directivity angle width based on a width of a street where said vehicle is traveling.

5. The vehicle approach notification sound generating apparatus according to claim 2, wherein said controller controls said directivity angle width with an output energy of said vehicle approach notification sound being constant.

6. The vehicle approach notification sound generating apparatus according to claim 1, wherein said controller further controls said directivity angle width based on a width of said vehicle or a width of a street where said vehicle is traveling.

7. The vehicle approach notification sound generating apparatus according to claim 2, wherein said controller determines whether said vehicle approach notification sound should be generated based on a road where said vehicle is currently traveling.

\* \* \* \* \*